United States Patent [19]

Nelson et al.

[11] Patent Number: 4,600,598
[45] Date of Patent: Jul. 15, 1986

[54] CONDUCTIVE COATINGS

[75] Inventors: Ronald S. Nelson, Trinity; John D. Loflin, Jamestown, both of N.C.

[73] Assignee: The Lilly Company, High Point, N.C.

[21] Appl. No.: 721,373

[22] Filed: Apr. 9, 1985

Related U.S. Application Data

[62] Division of Ser. No. 512,549, Jul. 11, 1983, Pat. No. 4,530,778.

[51] Int. Cl.$^4$ ............................................. B05D 1/04
[52] U.S. Cl. ..................................... 427/27; 427/393; 252/500; 252/518
[58] Field of Search ................. 427/27, 393, 397, 25; 106/34; 252/500, 518

[56] References Cited

U.S. PATENT DOCUMENTS

| | | | |
|---|---|---|---|
| 3,236,679 | 2/1966 | Spiller et al. | 427/27 |
| 3,967,011 | 6/1976 | Dunn et al. | 427/397 |
| 4,132,674 | 1/1979 | Hwang | 252/500 |
| 4,382,105 | 5/1983 | Amundsen et al. | 427/397 |
| 4,454,058 | 6/1984 | Savit | 252/500 |

*Primary Examiner*—Josephine L. Barr
*Attorney, Agent, or Firm*—Dressler, Goldsmith, Shore, Sutker & Milnamow, Ltd.

[57] ABSTRACT

A conductive pretreatment solution is disclosed which renders dried wood electrostatically coatable through several coatings while minimizing contamination of the topcoat. The pretreatment solution comprises a volatile liquid carrier selected from water and organic solvents, the carrier having dissolved therein, per 100 parts by volume of total solution, (1) from 0.2 to 3 parts by volume of an organic quaternary ammonium compound having a molecular weight below about 1000, (2) from 0.2 to 10 parts by volume of a low volatile liquid polyol having a molecular weight below about 400, and (3) from 0.1 to 3 parts by weight of an inorganic ionizable salt having a capacity to absorb moisture, especially chlorides of a cation selected from the group consisting of ammonium, magnesium and calcium.

19 Claims, No Drawings

CONDUCTIVE COATINGS

This is a division, of application Ser. No. 512,549, filed July 11, 1983 now U.S. Pat. No. 4,530,778.

TECHNICAL FIELD

This invention relates to compositions adapted to be applied to the surface of insulators, and especially dried wood surfaces, to render the same durably conductive, especially after exposure to moisture in a high humidity chamber.

BACKGROUND ART

Electrostatic spray processes deposit coating materials with great efficiency, thus minimizing waste and pollution, but they normally demand that the base to be coated be conductive so that the charge can be carried away to a ground. This is easily carried out when the substrate is conductive, but dried wood and plastics are insulators, so the charge builds up on the substrate being coated to repel the charged coating particles. This destroys the effectiveness of the electrocoating process.

It is known to pretreat the surface of the insulator to render it conductive, and aqueous and nonaqueous solutions containing ionizable compounds, both organic and inorganic, have been used for this purpose. As a result, electrostatic spray processes are now commonly used to coat wood and plastic surfaces.

It is desired to maximize the effectiveness of the electrostatic coating of insulators, and especially wood, where a plurality of coatings must be applied in order to provide the desired finish. The difficulty is that the coatings are of insulating character, and it is desired that the initial pretreatment of the substrate continue to provide a capacity to receive charged spray particles after several coatings have been applied.

To achieve this result, it is known to expose the pretreated and coated objects to high humidity in order to enhance the conductivity of the pretreatment, but even this expedient fails after a few coatings. Unfortunately, the normal finishing of wood for furniture use involves many coatings, so superior pretreatments are needed to extend the number of coatings which can be eftively received by the pretreated substrate (following humidification in known fashion).

It is also known that conductive pretreatments adversely effect wood. Thus, and while aqueous pretreatments are broadly useful herein, they can injure wood and solvent solutions are preferred. Agents which damage or discolor the wood (either immediately or with time) or which interfere with adhesion of the coatings to one another or with the capacity of the coating and the substrate to resist changing environments, are preferably avoided.

Also, the conductive agents are sensitive to moisture, and if these are present in the finished coating, they can render it sensitive to moisture. This causes the coating to blush (whiten) in high humidity atmosphere at room or lower temperature. As will be evident, this adverse result must also be avoided.

DISCLOSURE OF INVENTION

In this invention, a conductive pretreatment solution comprises a volatile liquid carrier selected from water and organic solvents. This carrier has dissolved therein, per 100 parts by volume of total solution, (1) from 0.2 to 3 parts by volume of an organic quaternary ammonium compound having a molecular weight below about 1000, (2) from 0.2 to 10 parts by volume of a low volatile liquid polyol having a molecular weight below about 400, and (3) from 0.1 to 3 parts by weight of an inorganic ionizable salt having a capacity to absorb moisture. Chloride salts are preferred, especially chloride salts of a cation selected from the group consisting of ammonium, magnesium and calcium. Ammonium salts yield the best dye compatibility.

The volatile liquid carrier is preferably constituted by organic solvent together with from 0.1 to 4 parts by volume of water per 100 parts of total volume.

The quaternary compound preferably has a molecular weight below about 400, and the polyol preferably has a molecular weight below about 200 and contains at least three hydroxyl groups per molecule. Benzyl trimethyl ammonium chloride and glycerine are especially preferred. Based on the same 100 parts by volume of total solution, it is preferred to employ 0.5–1.5 parts by volume of the quaternary compound, from 1.0–3.0 parts by volume of the polyol, and from 0.2–1.5 parts by weight of the salt, preferably the chloride salt.

Lastly, and since application to dried wood is particularly contemplated, it is desirable to have at least 20% of the volatile solvents constituted by alcoholic solvents, such as methanol. Also, it is sometimes helpful to have from 5–15% of the volatile solvents constituted by 2-ethoxy diethylene glycol which will constitute part of the alcoholic solvent.

It will be observed that the solutions used herein contain a combination of three active components. When any one of the three is omitted, the increased conductivity which is provided (or which is enhanced by high humidity exposure) is quickly lost. The increased conductivity provided herein is more durable.

It will also be observed that the solutions used herein are dilute solutions. As a result, after the wood surface has been wetted and dried to remove volatile solvent, excessive amounts of the active agents are not applied. These would bleed through the various applied coatings and contaminate the topcoat thereby impairing its resistance to moisture.

An important aspect of this invention is the enhanced capacity of the conductive pretreatments of this invention to enable electrostatic deposition even when conductivity measurements of the coated surface being electrocoated with the desired topcoat are so low as to be normally regarded as not electrostatically sprayable. It is this combination of electrical visibility (to the charged spray particles being attracted to the grounded target) and chemical invisibility (which prevents contamination of the topcoat) which uniquely characterizes this invention and enables electrodeposition to take place without rendering the usual nitrocellulose topcoats for wood unduly sensitive to moisture. This defect leads to blushing in humid atmospheres.

It may be helpful to understand something about wood and electrostatic coating. Charged spray particles are attracted to a grounded target by virtue of the difference between the charge on the particles and the charge on the target. If the target is an insulator, the charge builds up on that target because it cannot get to the ground, and now the target and the spray particles have a like charge and the spray particles are repelled. Wood must be dried to about 6–8% moisture to be able to withstand the changes in humidity which are normally encountered on any continental land mass. At this low moisture content, wood is too resistive to be electrostatically sprayed. This is why the wood must be wetted with an agent which will improve its conductivity, and why this agent is preferably not water, though a small amount of water is helpful in this invention. Of course, if water is used as the carrier, one can dry the wood to remove as much of the added moisture as one wishes. Also, the pretreatments of this invention, while of especial importance to the treatment of wood, can be used for the treatment of other insulating surfaces which are not sensitive to water.

Humidification is an optional, albeit a desirable, feature. This is because the pretreatment enhances conductivity without humidification, so one might accept a lesser conductivity in some coating sequences. Also, some atmospheres are more humid than others, so separate humidification may not be needed, as on a hot and humid summer day.

Any organic quaternary ammonium compound having a molecular weight below about 1000 can be used herein. While higher molecular weight compounds are suggested as useful in the prior art, present experience has demonstrated that these are not satisfactory herein. The quaternary ammonium compound may have a single quaternized nitrogen atom, or it may have more than one, e.g., diquaternary ammonium compounds are available and are useful herein. N, N, N, trimethyl benzyl ammonium chloride is particularly preferred and will be used herein as illustrative (the N, N, N, identification is understood and normally omitted). The use of organic quaternary ammonium compounds for the subject purpose is discussed at length in Spiller et al. U.S. Pat. No. 3,236,679, and any of the many quaternary ammonium compounds named therein may be used herein so long as the required low molecular weight is present. Thus, Spiller et al. indicate a preference for quaternary and diquaternary ammonium chlorides having a carbon to nitrogen ratio of from 10:1 to 30:1, and this is satisfactory herein so long as only low molecular weight materials are selected.

While glycerine is the preferred low volatile liquid polyol, other similar materials such as trimethylol propane, diethylene glycol, dipropylene glycol, and triethylene glycol are also useful. Higher functional polyols, like sorbitol, are also useful. Waxy material, like high molecular weight polyethylene glycols create problems and are not useful.

EXAMPLE 1

(Stain)

| Parts by Volume | |
|---|---|
| 100 | methanol containing 0.75 weight percent of a dye colorant |
| 2 | 40% aqueous solution of N,N,N, trimethyl benzyl ammonium chloride |
| 2 | glycerine |
| 1 | [weight percent] calcium chloride (anhydrous) [commercial grade containing 94-97% calcium chloride] |

The above are blended together with simple stirring for 5-10 minutes to dissolve the calcium chloride in the solution.

EXAMPLE 2

(Pigmented Stain)

| Parts by Volume | |
|---|---|
| 30 | methanol |
| 30 | methyl ethyl ketone |
| 40 | butyl acetate with 0.8 wt. % pigments |
| 1 | 40% aqueous solution of N,N,N, trimethyl benzyl ammonium chloride |
| 1 | glycerine |
| 0.5 | [weight percent] calcium chloride (same as in Example 1) |

The above are mixed together as in Example 1.

EXAMPLE 3

Pecan wood is dried to 6%-8% moisture content and is wetted (by air spraying) with the stain of Example 1. Enough spray is applied so that the wood surface is wet to the eye, and then application is stopped. The wetted wood air dries in 15 minutes.

A wash coat is then electrostatically applied to wet the pretreated substrate. The wash coat is a clear 12% solids by weight nitrocellulose lacquer and is air dried for 30 minutes and is then scuff sanded.

A pigmented wiping stain consisting of 14% of alkyd resin by volume, 28% by weight of pigments, balance Varsol solvent, is then electrostatically sprayed on, wiped clean, and then air dried for one hour.

A 16% solids by weight nitrocellulose lacquer sealer is then electrostatically sprayed on to wet the surface, air dried for 45 minutes and then scuff sanded.

A pigmented glaze stain consisting of 16% fatty triglyceride oil by volume, 22% pigments by weight, balance mineral spirits, is then sprayed on to wet the surface, wiped clean, and air dried for 30 minutes. Electrostatic spray may be used, but in this example a simple air spray was used.

The finishing operation is performed in this instance in two stages. First, a wet coat of a clear 19% solids by weight nitrocellulose lacquer is applied by electrostatic spray and air dried for 45 minutes. After drying and humidification exposure (30 seconds at 93% relative humidity at 55° F.), little if any response is shown on a Ransburg Sprayability Meter Number 236 (Ransburg Electrocoating Corp., Indianapolis, In.). This would normally indicate that electrostatic spraying could not be used, or not used effectively (the reading is in the range identified on the meter as "non-sprayable").

Despite this, a topcoat of the same composition as the first finish was sprayed on using an electrostatic system in which an air spray is charged by passing the spray particles past electrodes charged to 80 kilovolts. The spray equipment is spaced from the target by a distance of 1 to 3 feet (varied during application because the target turns in front of the spray gun). A wet coat was applied and air dried for 2 hours. The electrostatic spray produced a good deposition efficiency showing that the pretreatment was fully effective even though no surface conductivity had been detected by the sprayability meter, as previously noted.

Testing of the finished wood in humidity chambers to see if the presence of the pretreatment impaired blush resistance revealed no adverse effect.

The topcoat referred to in this example is as follows:

|                              | Volume Percent |
|------------------------------|----------------|
| ½ second nitrocellulose      | 8.01           |
| short oil length coconut alkyd | 6.02         |
| urea-formaldehyde condensate | 0.31           |
| dioctyl phthalate            | 3.6            |
| finely divided silica        | 0.17           |
| butyl acetate                | 15.33          |
| isobutyl isobutyrate         | 15.0           |
| 2-butoxy ethanol             | 2.33           |
| isobutyl acetate             | 15.82          |
| xylol                        | 5.71           |
| toluol                       | 9.62           |
| lacquer diluent              | 18.08          |

The lacquer diluent referred to in these examples is as follows:

|                                      | Parts by Volume |
|--------------------------------------|-----------------|
| lactol spirits (Union Chemical Company) | 8.37         |
| butyl alcohol                        | .63             |
| isopropyl alcohol                    | 5.95            |
| VM & P Naphtha                       | 2.61            |
| acetone                              | .52             |

Similar results are obtained when the two nitrocellulose lacquer finish coat are replaced by solvent solution finish coats containing all sorts of film-forming resins, such as cellulose acetate butyrate, alkyd urea varnishes, polyester topcoats, polyurethane topcoats, and vinyl resin topcoats, as illustrated by solution copolymers of vinyl chloride and vinyl acetate. In each instance, the electrostatically sprayed finish coat is effectively electrodeposited, but the conductive agents are sufficiently remote that the water resistance of the topcoats is not impaired.

What is claimed is:

1. A method of coating dried wood comprising applying to the surface of said wood a conductive pretreatment solution comprising a volatile liquid carrier selected from the group consisting of water and organic solvents, said carrier having dissolved therein, per 100 parts by volume of total solution, (1) from 0.2 to 3 parts by volume of an organic quaternary ammonium compound having a molecular weight below about 1000, (2) from 0.2 to 10 parts by volume of a low volatile liquid polyol having a molecular weight below about 400, and (3) from 0.1 to 3 parts by weight of an inorganic ionizable salt having a capacity to absorb moisture, and drying the same to remove said volatile carrier, then applying and drying at least one coating selected from washcoats, wiping stains, sealers, glazes, fillers, lacquer undercoats and lacquer enamels, and then electrostatically applying a solvent solution topcoat containing a film-forming resin, whereby said pretreatment is effective to assist electrostatic deposition of said topcoat without causing said topcoat to blush in humid atmospheres.

2. A method as recited in claim 1 in which said salt is a chloride salt.

3. A method as recited in claim 2 in which said chloride salt is a salt of a cation selected from the group consisting of ammonium, magnesium and calcium.

4. A method as recited in claim 3 in which said solvent is constituted by organic solvents and from 0.1 to 4 parts water by volume per 100 parts total volume.

5. A method as recited in claim 3 in which said quaternary compound has a molecular weight below about 400, said polyol has a molecular weight below about 200 and contains at least three hydroxyl groups per molecule.

6. A method as recited in claim 5 in which said quaternary compound is present in an amount of from 0.5–1.5 parts by volume, said polyol is present in an amount of from 1.0–3.0 parts by volume and said chloride salt is present in an amount of from 0.2–1.5 parts by weight.

7. A method as recited in claim 3 in which said volatile solvents contain at least 20% of alcoholic solvent.

8. A method as recited in claim 5 in which said polyol is glycerine.

9. A method as recited in claim 5 in which said quaternary compound is benzyl trimethyl ammonium chloride.

10. A method as recited in claim 5 in which said salt is calcium chloride.

11. A method as recited in claim 5 in which said salt is ammonium chloride.

12. A method as recited in claim 1 in which said pretreated wood with said coatings thereon is subjected to a high humidity treatment shortly before the electrostatic deposition of said topcoat.

13. A method as recited in claim 12 in which said topcoat is electrodeposited while the surface of said pretreated and coated wood fails to show sufficient conductivity for electrostatic deposition when tested with electrodes placed at the surface thereof.

14. A method as recited in claim 1 in which said topcoat is a nitrocellulose lacquer.

15. A method as recited in claim 1 in which said topcoat is a cellulose acetate butyrate topcoat.

16. A method as recited in claim 1 in which said topcoat is an alkyd urea varnish.

17. A method as recited in claim 1 in which said topcoat is a polyester topcoat.

18. A method as recited in claim 1 in which said topcoat is a vinyl resin topcoat.

19. A method as recited in claim 1 in which said topcoat is a polyurethane topcoat.

* * * * *